US012769232B2

(12) United States Patent
Ozawa

(10) Patent No.: US 12,769,232 B2
(45) Date of Patent: Oct. 20, 2026

(54) IMAGE FORMING APPARATUS INCLUDING A COVER WITH A PRESSING PORTION HAVING AN INCLINED PORTION

(71) Applicant: Haruki Ozawa, Kanagawa (JP)

(72) Inventor: Haruki Ozawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/180,163

(22) Filed: Apr. 16, 2025

(65) Prior Publication Data

US 2025/0328096 A1 Oct. 23, 2025

(30) Foreign Application Priority Data

Apr. 23, 2024 (JP) ................................ 2024-069624

(51) Int. Cl.

| | |
|---|---|
| ***G03G 21/00*** | (2006.01) |
| ***G03G 15/20*** | (2006.01) |
| ***G03G 21/16*** | (2006.01) |

(52) U.S. Cl.

CPC ..... *G03G 15/2035* (2013.01); *G03G 15/2064* (2013.01); *G03G 21/1638* (2013.01); *G03G 21/1685* (2013.01); *G03G 2221/1639* (2013.01); *G03G 2221/1675* (2013.01)

(58) Field of Classification Search

None

See application file for complete search history.

(56) References Cited

FOREIGN PATENT DOCUMENTS

| | | |
|---|---|---|
| JP | 2001-201975 A | 7/2001 |
| JP | 2005-208542 A | 8/2005 |

OTHER PUBLICATIONS

Text of cited reference JP2001-201975A (Year: 2001).*

* cited by examiner

*Primary Examiner* — Quana Grainger

(74) *Attorney, Agent, or Firm* — XSENSUS LLP

(57) ABSTRACT

An image forming apparatus includes a pressing mechanism, a body, and a cover. The pressing mechanism includes a pressure lever rotatable about a first shaft, a pressure release lever rotatable about a second shaft, and an elastic body coupling the levers. The pressure lever presses a pressing body against a pressed body. The pressure release lever moves between a holding position to cause the pressure lever to press the pressing body against the pressed body and a release position to cause the pressure lever to release the pressing body from the pressed body. The cover includes a pressing portion to move the pressure release lever from the release position to the holding position in response to a closing operation to close the cover. The pressing portion has an inclined portion contacting and guiding the pressure release lever to restrict an inclination of the second shaft relative to a horizontal direction.

20 Claims, 7 Drawing Sheets

FIG. 8A
FIG. 8B
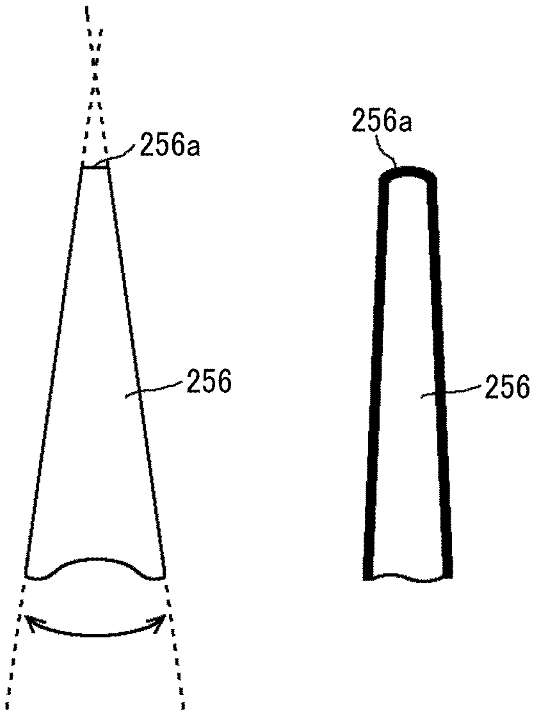
FIG. 9
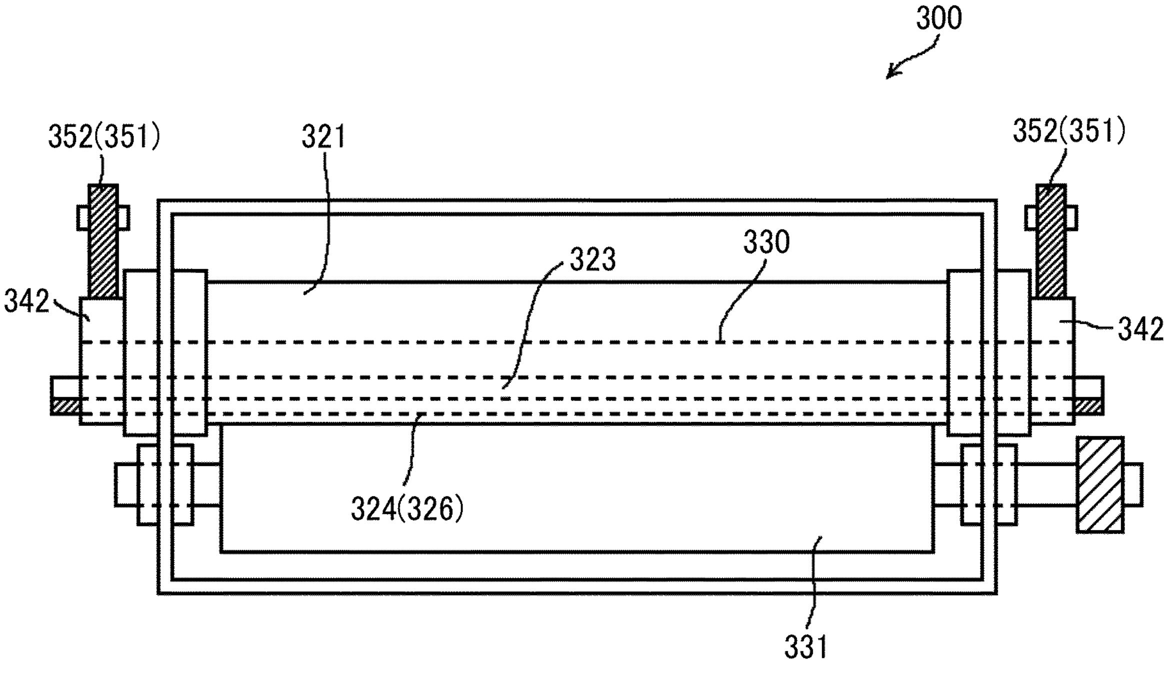

IMAGE FORMING APPARATUS INCLUDING A COVER WITH A PRESSING PORTION HAVING AN INCLINED PORTION

CROSS-REFERENCE TO RELATED APPLICATION

This patent application is based on and claims priority pursuant to 35 U.S.C. § 119(a) to Japanese Patent Application No. 2024-069624, filed on Apr. 23, 2024, in the Japan Patent Office, the entire disclosure of which is hereby incorporated by reference herein.

BACKGROUND

Technical Field

The present disclosure relates to an image forming apparatus.

Related Art

A typical image forming apparatus such as a copier, a printer, or a facsimile machine includes a fixing device. The fixing device includes a pair of rollers, a fixing roller, and a pressure roller. The image forming apparatus includes a pressing mechanism to press the pressure roller against the fixing roller. The pressing mechanism presses the pressure roller against the fixing roller in conjunction with an operation closing a cover or a door. The pressing mechanism releases the pressure roller from the fixing roller in conjunction with an operation opening the cover or the door.

Opening an opening and closing member such as a cover or a door causes the pressing mechanism to automatically release the pressure contact state of the roller pair and enables jam processing that a user removes a recording medium jammed in the roller pair, and thus, convenience can be enhanced.

SUMMARY

The present disclosure described herein provides an image forming apparatus including a pressing mechanism, a body, and a cover. The pressing mechanism includes a pressure lever, a pressure release lever, and an elastic body. The pressure lever is rotatable about a first shaft and presses a pressing body against a pressed body. The pressure release lever is rotatable about a second shaft and is movable between a holding position to cause the pressure lever to press the pressing body against the pressed body and a release position to cause the pressure lever to release the pressing body from the pressed body. The elastic body couples the pressure lever and the pressure release lever. The body houses the pressing mechanism. The cover openably closes the body. The cover includes a pressing portion to press and move the pressure release lever from the release position to the holding position in response to a closing operation to close the cover. The pressing portion has an inclined portion contacting and guiding the pressure release lever to restrict an inclination of the second shaft relative to a horizontal direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 8A is a schematic diagram illustrating a tapered shape of the pressure release lever according to a modification;

FIG. 8B is a schematic diagram illustrating the tip shape of the pressure release lever according to a modification;

FIG. 9 is a schematic cross-sectional view of a fixing device according to a modification of the present disclosure to illustrate parts extending in a width direction;

Figure 1:
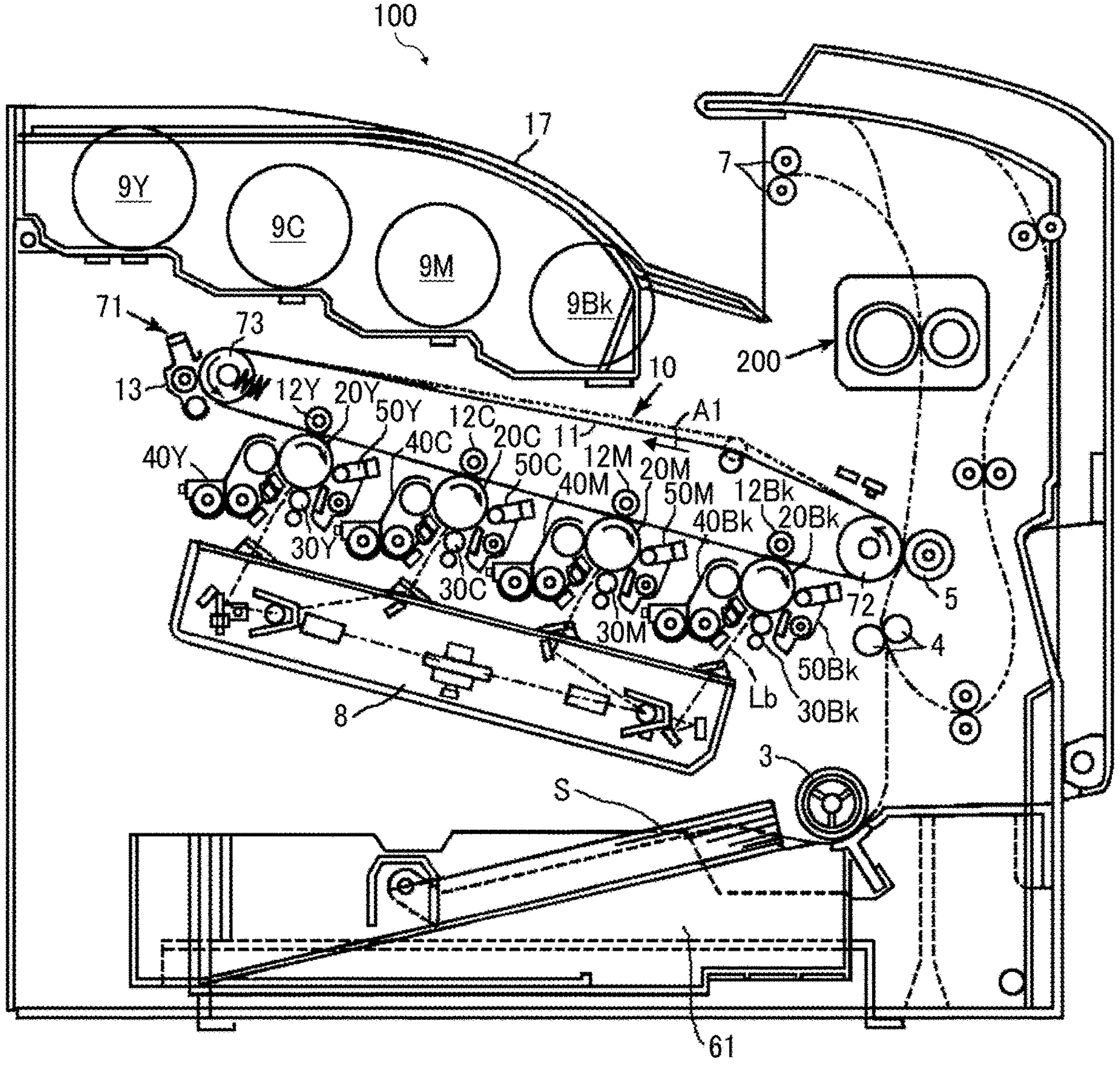
FIG. 1 is a schematic diagram illustrating a configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to FIG. 1, the structure of an image forming apparatus 100 is described below. The image forming apparatus 100 illustrated in FIG. 1 is a color image forming apparatus employing a tandem system that includes multiple image forming devices aligned in a stretch direction of a belt to form multiple color images. However, the image forming apparatus 100 may employ other systems and may be a copier, a facsimile machine, a printer, a multifunction peripheral, or a multifunction image forming apparatus (MFP) having at least one of copying, printing, scanning, facsimile, and plotter functions.

The image forming apparatus 100 employs a tandem structure in which four photoconductor drums 20Y, 20C, 20M, and 20Bk serving as image bearers that bear yellow, cyan, magenta, and black toner images in separation colors, respectively, are arranged side by side.

In the image forming apparatus 100, the yellow, cyan, magenta, and black toner images formed on the photoconductor drums 20Y, 20C, 20M, and 20Bk, respectively, as visible images are primarily transferred successively onto a transfer belt 11, that is, an endless belt serving as an intermediate transferor, disposed opposite the photoconductor drums 20Y, 20C, 20M, and 20Bk as the transfer belt 11 rotates in a rotation direction A1 in a primary transfer process. Through the primary transfer process, the yellow, cyan, magenta, and black toner images are superimposed and transferred onto the transfer belt 11 and then secondarily transferred onto the recording medium S such as a sheet collectively in a secondary transfer process.

Each of the photoconductor drums 20Y, 20C, 20M, and 20Bk is surrounded by image forming units that form the yellow, cyan, magenta, and black toner images on the photoconductor drums 20Y, 20C, 20M, and 20Bk as the photoconductor drums 20Y, 20C, 20M, and 20Bk rotate clockwise in FIG. 1. For example, the photoconductor drum 20Bk on which the black toner image is formed is surrounded by a charger 30Bk, a developing device 40Bk, a primary transfer roller 12Bk, and a cleaning device 50Bk in a rotation direction of the photoconductor drum 20Bk, which perform image formation processing. Similarly, the image forming apparatus 100 includes chargers 30Y, 30C, and 30M, developing devices 40Y, 40C, and 40M, primary transfer rollers 12Y, 12C, and 12M, and cleaning devices 50Y, 50C, and 50M. After the chargers 30Y, 30C, 30M, and 30Bk charge the respective photoconductor drums 20Y, 20C, 20M, and 20Bk, an optical writing device 8 writes electrostatic latent images on the photoconductor drums 20Y, 20C, 20M, and 20Bk with laser beams Lb serving as writing light, respectively.

As the transfer belt 11 rotates in the direction of rotation A1, the yellow, cyan, magenta, and black toner images formed as visible images on the photoconductor drums 20Y, 20C, 20M, and 20Bk, respectively, are primarily transferred onto the transfer belt 11 such that the yellow, cyan, magenta, and black toner images are superimposed one atop another on the transfer belt 11. In the primary transfer process, the primary transfer rollers 12Y, 12C, 12M, and 12Bk disposed opposite the photoconductor drums 20Y, 20C, 20M, and 20Bk via the transfer belt 11, respectively, apply a primary transfer bias to the photoconductor drums 20Y, 20C, 20M, and 20Bk successively from the upstream photoconductor drum 20Y to the downstream photoconductor drum 20Bk in the rotation direction A1 of the transfer belt 11.

The photoconductor drums 20Y, 20C, 20M, and 20Bk are aligned in this order in the rotation direction A1 of the transfer belt 11. The photoconductor drums 20Y, 20C, 20M, and 20Bk are located in four imaging stations that form the yellow, cyan, magenta, and black toner images, respectively.

The image forming apparatus 100 includes the four image forming stations, a transfer belt unit 10, a secondary transfer roller 5, a belt cleaner 13, and the optical writing device 8. The transfer belt unit 10 is situated above and disposed opposite the photoconductor drums 20Y, 20C, 20M, and 20Bk. The transfer belt unit 10 incorporates the transfer belt 11 and the primary transfer rollers 12Y, 12C, 12M, and 12Bk. The secondary transfer roller 5 serves as a transferor disposed opposite the transfer belt 11 and driven and rotated in accordance with the rotation of the transfer belt 11. The belt cleaner 13 is disposed opposite the transfer belt 11 to clean the transfer belt 11. The optical writing device 8 is situated below and disposed opposite the four image forming stations.

The optical writing device 8 includes a semiconductor laser as a light source, a coupling lens, an fθ lens, a toroidal lens, a deflection mirror, and a rotatable polygon mirror as a deflector. According to image data of yellow, cyan, magenta, and black, the optical writing device 8 emits the laser beams Lb to the photoconductor drums 20Y, 20C, 20M, and 20Bk to form electrostatic latent images on the photoconductor drums 20Y, 20C, 20M, and 20Bk, respectively. In FIG. 1, for the sake of convenience, the laser beam Lb is labeled only for the black image station, but the same applies to the other image stations.

The image forming apparatus 100 further includes a sheet feeder 61 and a registration roller pair 4. The sheet feeder 61 incorporates a sheet tray that loads recording media S to be conveyed to a secondary transfer nip formed between the transfer belt 11 and the secondary transfer roller 5. The registration roller pair 4 conveys a recording medium S conveyed from the sheet feeder 61 to the secondary transfer nip formed between the transfer belt 11 and the secondary transfer roller 5 at a predetermined time when the yellow, cyan, magenta, and black toner images superimposed on the transfer belt 11 reach the secondary transfer nip. The image forming apparatus 100 further includes a sensor that detects a leading edge of the recording medium S as it reaches the registration roller pair 4.

The image forming apparatus 100 further includes a fixing device 200, an output roller pair 7, an output tray 17, and toner bottles 9Y, 9C, 9M, and 9Bk. The fixing device 200 as a fixing unit employing a belt fixing system fixes a color toner image formed by the yellow, cyan, magenta, and black toner images secondarily transferred from the transfer belt 11 onto the recording medium S thereon. The output roller pair 7 ejects the recording medium S bearing the fixed toner image onto an outside of the image forming apparatus 100, that is, the output tray 17. The output tray 17 is disposed atop the image forming apparatus 100 and stacks the recording medium S ejected by the output roller pair 7 to the outside of the image forming apparatus 100. The toner bottles 9Y, 9C, 9M, and 9Bk are situated below the output tray 17 and replenished with fresh yellow, cyan, magenta, and black toners, respectively.

The transfer belt unit 10 includes a drive roller 72 and a driven roller 73 around which the transfer belt 11 is wound, in addition to the transfer belt 11 and the primary transfer rollers 12Y, 12C, 12M, and 12Bk.

Since the driven roller 73 also serves as a tension applicator that applies tension to the transfer belt 11, a biasing member (e.g., a spring) biases the driven roller 73 against the transfer belt 11. A transfer device 71 includes the transfer belt unit 10, the primary transfer rollers 12Y, 12C, 12M, and 12Bk, the secondary transfer roller 5, and the belt cleaner 13.

The sheet feeder 61 is disposed in a lower portion of the body of the image forming apparatus 100. The sheet feeder 61 includes a feed roller 3 that comes into contact with an upper surface of an uppermost recording medium S of the recording media S loaded on the sheet tray of the sheet feeder 61. As the feed roller 3 is driven and rotated counterclockwise in FIG. 1, the feed roller 3 feeds the uppermost recording medium S to the registration roller pair 4.

The belt cleaner 13 in the transfer device 71 includes a cleaning brush and a cleaning blade disposed to face and contact the transfer belt 11. The cleaning brush and the cleaning blade in the belt cleaner 13 scrape a foreign substance such as residual toner off the transfer belt 11, removing the foreign substance from the transfer belt 11 and thereby cleaning the transfer belt 11.

The belt cleaner 13 further includes a waste toner conveyer that conveys and discards the residual toner removed from the transfer belt 11.

Figure 2:
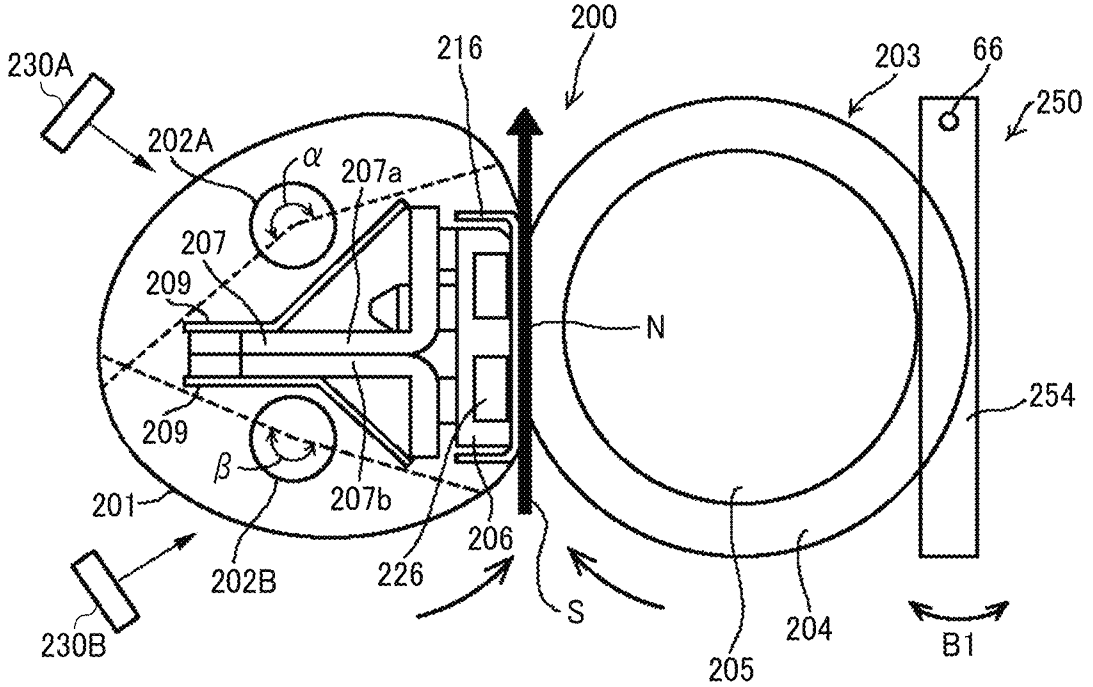
FIG. 2 is a schematic cross-sectional view of a fixing device to illustrate a configuration of the fixing device.

FIG. 2 is a schematic cross-sectional view of the fixing device 200 to illustrate the configuration of the fixing device 200. As illustrated in FIG. 2, the fixing device 200 includes a fixing belt 201 as a rotatable fixing rotator and a pressure roller 203 as a rotatable pressure rotator disposed opposite the fixing belt 201. A halogen heater 202A and a halogen heater 202B as multiple heat sources directly heat the inner circumferential surface of the fixing belt 201 with radiant heat.

The fixing device 200 includes temperature sensors 230A and 230B to detect temperatures of the fixing belt 201. The temperature sensors 230A and 230B are not in contact with the fixing belt 201 but can detect temperatures of the fixing belt 201. A controller that is circuitry controls a lightning rate of each of the halogen heaters 202A and 202B based on temperatures detected by the temperature sensors 230A and 230B to control the temperatures of the fixing belt 201 to a desired temperature.

The fixing belt 201 is an endless belt or film made of metal, such as nickel or stainless steel (e.g., steel use stainless or SUS), or resin such as polyimide. The surface layer of the fixing belt 201 has a release layer. The release layer is made of perfluoroalkoxy alkane (PFA) or polytetrafluoroethylene (PTFE) to facilitate separation of toner of the toner image on the sheet P from the fixing belt 201, thus preventing the toner of the toner image from adhering to the fixing belt 201. Preferably, the fixing belt 201 includes an elastic layer made of silicone rubber interposed between a base layer and the release layer made of PFA or PTFE.

Omitting the elastic layer made of silicone rubber reduces thermal capacity and enhances a fixing performance. However, the slight surface roughness of the fixing belt 201 may be transferred onto the toner image while the toner image is pressed and fixed onto the recording medium, causing an orange-peel image, which is an image having uneven gloss in a solid part of the image. To reduce the uneven gloss or the orange peel image, the elastic layer made of silicone rubber has a thickness of 100 μm or more. As the elastic layer deforms, the elastic layer absorbs the slight surface asperities, reducing the orange peel image.

The pressure roller 203 includes a core 205, an elastic rubber layer 204, and a release layer. The elastic rubber layer 204 is disposed on the core 205. The release layer serves as a surface layer that facilitates separation of the sheet P from the pressure roller 203. The release layer is made of PFA or PTFE. A driver such as a motor is disposed in the image forming apparatus 100 and transmits driving force to the pressure roller 203 through gears to rotate the pressure roller 203. A spring presses the pressure roller 203 against the fixing belt 201, and the elastic rubber layer 204 is compressed and deformed so that a fixing nip N has a predetermined nip width.

The pressure roller 203 may be a hollow roller and include a heat source such as the halogen heater inside the pressure roller 203. The elastic rubber layer 204 may be made of solid rubber. Alternatively, if no heater is disposed inside the pressure roller 203, sponge rubber may be used. The sponge rubber enhances the thermal insulation of the pressure roller 203, preferably causing the pressure roller 203 to draw less heat from the fixing belt 201.

Inside the loop of the fixing belt 201, the fixing device 200 includes a nip formation pad 206, a thermal conduction aid 216, and a stay 207. The nip formation pad 206 is disposed to face the pressure roller 203 and has a face facing the inner circumferential surface of the fixing belt 201. The thermal conduction aid 216 covers the face of the nip formation pad 206. The stay 207 holds the nip formation pad 206 against pressure from the pressure roller 203.

The nip formation pad 206 forms the fixing nip N between the fixing belt 201 and the pressure roller 203. In addition, the inner circumferential surface of the fixing belt 201 slides on the thermal conduction aid 216 that covers the nip formation pad 206.

End heaters 226 as end heat sources different from a main heat source (fixing heat source) are integrally attached to both ends of the nip formation pad 206 in the longitudinal direction of the nip formation pad 206. The end heater 226 is typically a contact heat transfer type heat source that is a resistive heat generator such as a ceramic heater.

The thermal conduction aid 216 prevents heat generated by the lateral end heaters 226 from being stored locally and facilitates conduction of heat in the longitudinal direction of the thermal conduction aid 216, thus reducing uneven temperature of the fixing belt 201 in the longitudinal direction of the nip formation pad. Hence, the thermal conduction aid 216 is preferably made of a material that conducts heat quickly, for example, a material having an increased thermal conductivity such as copper, aluminum, or silver. It is preferable that the thermal conduction aid 216 is made of copper or aluminum in a comprehensive view of manufacturing costs, availability, thermal conductivity, and processing.

The thermal conduction aid 216 has a nip formation surface disposed opposite the inner circumferential surface of the fixing belt 201 and is in direct contact with the inner circumferential surface of the fixing belt 201. A low-friction and abrasion-resistant sliding coating is applied to the surface of the thermal conduction aid 216, that is, the surface that comes into contact with the inner circumferential surface of the fixing belt 201. As the sliding coating, a material such as fluorine coating having low friction or diamond-like carbon (DLC) coating having high wear resistance is used.

The thermal conduction aid 216 has a flat shape in FIG. 2 but may have a concave shape or other shapes. The thermal conduction aid 216 having the concave shape forms the fixing nip N having the concave shape that directs the leading edge of the recording medium S toward the pressure roller 203 as the recording medium is ejected from the fixing nip N, facilitating separation of the recording medium from the fixing belt 201 and preventing jamming of the recording medium.

The stay 207 is a support supporting the nip formation pad 206 that forms the fixing nip N. The stay 207 prevents the nip formation pad 206 from being bent by pressure received from the pressure roller 203, attaining a uniform nip width of the fixing nip N in the axial direction of the pressure roller 203. Both ends of the stay 207 are held, fixed, and positioned by side plates.

The stay 207 has a fixing nip portion opposite the fixing nip N and lateral portions 207*a* and 207*b* projecting from the fixing nip portion toward the opposite side of the fixing nip N. The lateral portions 207*a* and 207*b* are disposed between the halogen heaters 202A and 202B as fixing heat sources. The halogen heaters 202A and 202B directly heat the inner circumferential surface of the fixing belt 201 with radiant heat.

The fixing device 200 includes reflectors 209. The reflector 209 is disposed between the stay 207 and one of the halogen heaters 202A and 202B to prevent the stay 207 from being heated by the radiant heat from the halogen heaters 202A and 202B and reduce wasteful energy consumption. Alternatively, instead of the reflectors 209, an opposed face of the stay 207 disposed opposite the halogen heater may be treated with insulation or mirror finish to obtain similar effects.

As illustrated in FIG. 2, the reflectors 209 disposed between the halogen heaters 202A and 202B prevent one heater from heating the glass tube of the other heater and enable efficiently heating the fixing belt 201.

The fixing device 200 includes a pressing mechanism 250 that brings the fixing belt 201 and the pressure roller 203 into contact with each other or separates the fixing belt 201 and the pressure roller 203 from each other to apply or release the pressure at the fixing nip N. The pressing mechanism 250 includes a pressure lever 254 that rotates about a rotation shaft 66 as a first shaft. The pressing mechanism 250 presses the pressure roller 203 against the fixing belt 201 to form the fixing nip N in a pressure contact portion between the fixing belt 201 and the pressure roller 203. The pressing mechanism 250 separates the pressure roller 203 from the fixing belt 201 to eliminate the fixing nip N.

Pressing the pressure roller 203 against the fixing belt 201 for a long time deforms the elastic rubber layer 204 for a long time. As a result, the elastic rubber layer 204 does not recover the original form. The deformation of the pressure roller 203 may cause abnormal noise or a gloss streak at the time of the next printing. To countermeasure the above disadvantages, the pressing mechanism 250 is operated to release the pressure in the fixing nip N after a predetermined time (for example, one minute) has elapsed since the fixing process is completed. The above-described countermeasure prevents the deformation of the elastic rubber layer 204, which prevents the deformation of the pressure roller 203 or reduces the amount of deformation of the pressure roller 203.

Additionally, when a sheet jam occurs, the pressing mechanism 250 releases the pressure in the fixing nip N, so that a user can easily remove the jammed sheet.

In the fixing device 200, the fixing belt 201 rotates in accordance with the rotation of the pressure roller 203. Specifically, as the driver drives and rotates the pressure roller 203, the driving force is transmitted from the pressure roller 203 to the fixing belt 201 at the fixing nip N, rotating the fixing belt 201 in accordance with the rotation of the pressure roller 203. The fixing belt 201 is sandwiched and rotated at the fixing nip N and travels while being guided by flanges at both ends in other portions than the fixing nip N. The toner image on the recording medium S is heated and pressed in the fixing nip N and is fixed.

With the construction described above, the fixing device 200 attaining quick warm-up is manufactured at reduced costs.

Figure 3A:
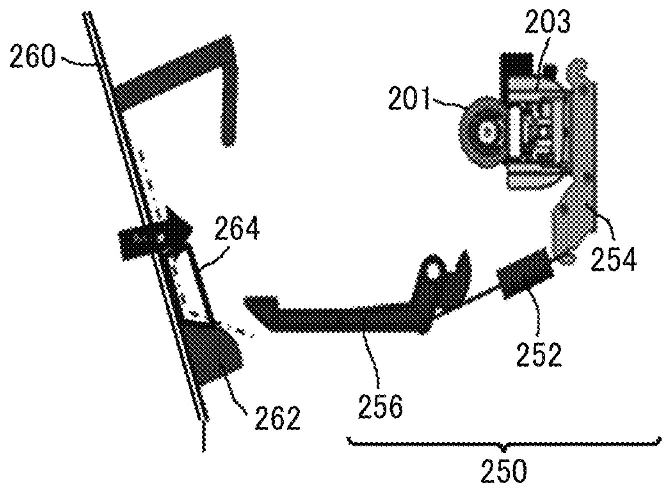
FIG. 3A is a schematic cross-sectional view of a pressing mechanism and an opened cover to illustrate a configuration of the pressing mechanism and the opened cover.
Figure 3B:
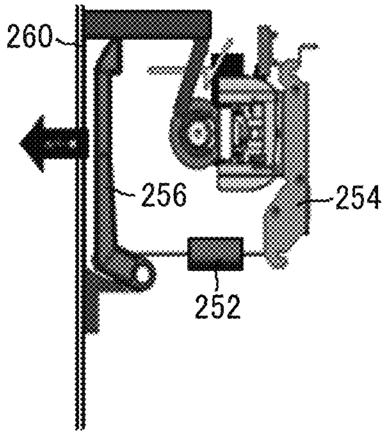
FIG. 3B is a schematic cross-sectional view of the pressing mechanism of FIG. 3A and the cover of FIG. 3A that is closed to illustrate a configuration of the pressing mechanism and the closed cover.

FIGS. 3A and 3B are schematic cross-sectional views of the pressing mechanism and the cover to illustrate the configuration of the pressing mechanism and the cover. In FIG. 3A, the cover is opened. In FIG. 3B, the cover is closed.

The image forming apparatus 100 includes the fixing device 200, the pressing mechanism 250, and a cover 260. The pressing mechanism 250 presses the pressure roller 203 as a pressing body against the fixing belt 201 as a pressed body. The cover 260 can open and close the body of the image forming apparatus 100.

The pressing mechanism 250 includes the pressure lever 254 and a pressure release lever 256. The pressure lever 254 has one end rotatably supported by the rotation shaft 66 as the first shaft and the other end to which a pressure spring 252 as an elastic body is coupled.

The pressure release lever 256 is rotatably supported and connected to the pressure lever 254 via the pressure spring 252. As a result, the pressure spring 252 as the elastic body couples the pressure lever 254 and the pressure release lever 256.

The pressure release lever 256 is movable between a release position illustrated in FIG. 3A and a holding position illustrated in FIG. 3B. At the release position, the pressure release lever 256 causes the pressure lever 254 to release the pressure of the pressure roller 203 pressing the fixing belt 201. At the holding position, the pressure release lever 256 causes the pressure lever 254 to press the pressure roller 203 against the fixing belt 201.

The cover 260 opens and closes the body of the image forming apparatus 100 that houses the fixing device 200 and the pressing mechanism 250. The cover 260 includes a guide 262 and a pressing portion 264. The guide 262 guides the pressure release lever 256 during the operation closing or opening the cover 260. The pressing portion 264 presses and moves the pressure release lever 256 from the release position to the holding position in response to a closing operation to close the cover 260.

The above-described configuration can press the pressure roller 203 against the fixing belt 201 or release the pressure of the pressure roller 203 pressing against the fixing belt 201 in conjunction with the operation opening or closing the cover 260.

A detailed description is given of issues solved by the present disclosure.

Figure 4A:
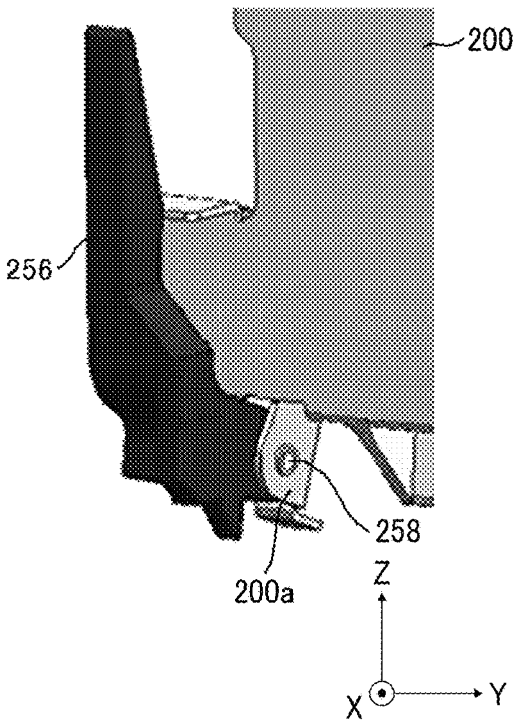
FIG. 4A is a perspective view illustrating a structure including a pressure release lever assembled to a fixing device.
Figure 4B:
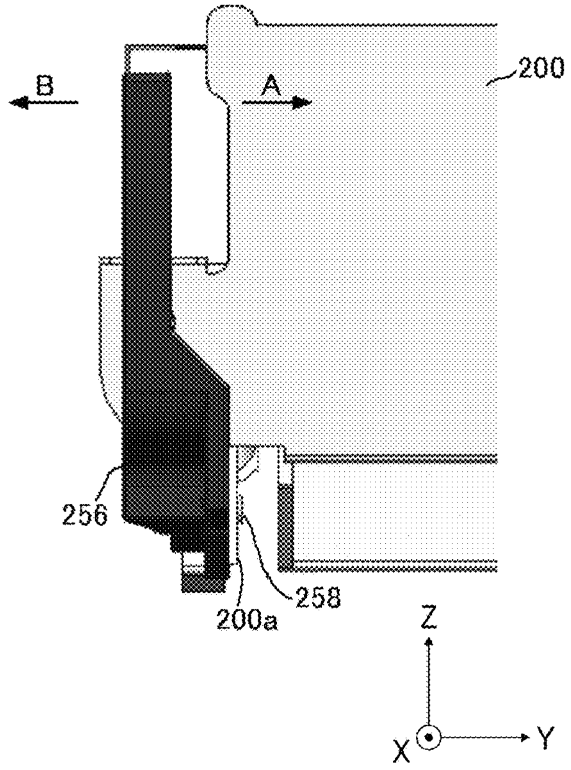
FIG. 4B is a back view of the structure of FIG. 4A.

FIGS. 4A and 4B illustrate a structure including the pressure release lever assembled to the fixing device. FIG. 4A is a perspective view of the structure, and FIG. 4B is a back view of the structure. As illustrated in FIG. 4A, the pressure release lever 256 is rotatably supported by a rotation shaft 258 as a second shaft, and the rotation shaft 258 is on a support 200*a* of the fixing device 200. The one end of the rotation shaft 258 is fixed to the support 200*a*, and the other end of the rotation shaft 258 is a free end and not fixed to the support 200*a*. In other words, the pressure release lever 256 is supported by a cantilever structure.

As illustrated in FIG. 4B, the cantilever structure holds the pressure release lever 256 not to move toward the support 200*a* in the direction indicated by an arrow A but does not hold the pressure release lever 256 not to move in the direction indicated by an arrow B that is the direction away from the support 200*a*. The operation closing the cover 260 causes the pressing portion 264 to press the pressure release lever 256, which may incline the pressure release lever 256 in the direction of the rotation shaft 258 (in this case, the direction indicated by the arrow B) and damage the rotation shaft 258. In other words, during the operation closing the cover 260, the pressing portion 264 presses the pressure release lever 256 and may cause an inclination of the rotation shaft 258 as the second shaft relative to a horizontal direction, which may damage the rotation shaft 258.

Supporting both sides of the pressure release lever 256 may be the countermeasure for the above but is not preferable from the viewpoint of weight reduction and reduction in component cost. Since the fixing unit including the fixing device 200 may be replaced due to the use over time, it is desirable that the fixing unit has a configuration as simple as possible.

Figure 5A:
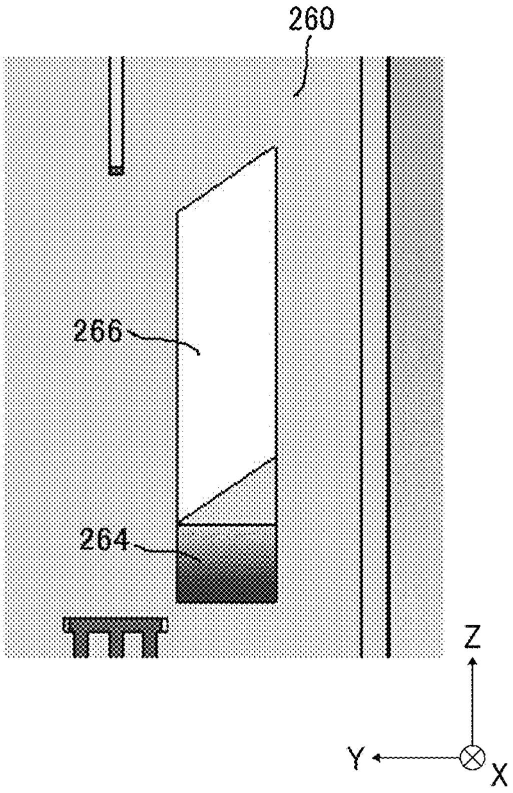
FIGS. 5A and 5B are plan views of a pressing portion on a cover.
Figure 5B:
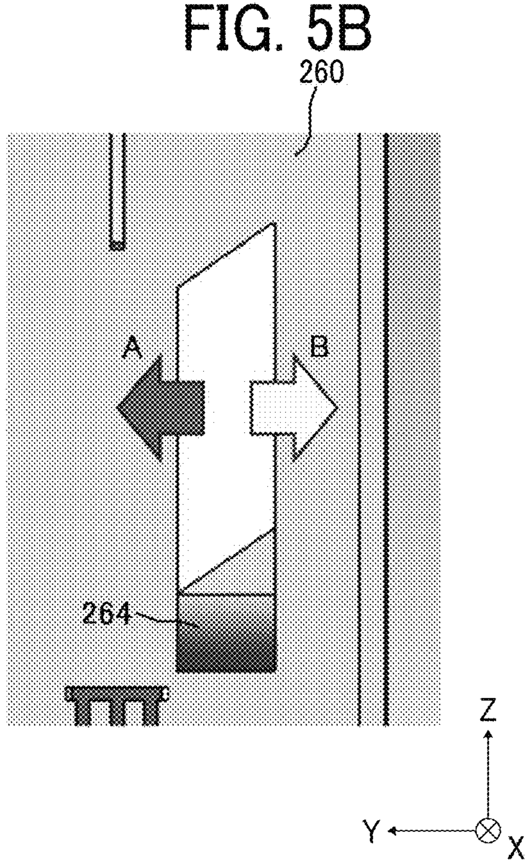

FIGS. 5A and 5B are plan views of the pressing portion on the cover. As illustrated in FIG. 5A, the pressing portion 264 on the cover 260 includes an inclined portion 266 having an inclined face inclined in one direction. Closing the cover 260 causes the inclined portion 266 of the pressing portion 264 to press the pressure release lever 256 and move the pressure release lever 256 from the release position to the holding position.

With reference to FIG. 4B, the pressure release lever 256 supported by the cantilever structure is likely to be inclined in the direction indicated by the arrow B. In contrast, as illustrated in FIG. 5B, the inclined portion 266 of the pressing portion 264 has the inclined face that becomes higher in the direction indicated by the arrow B (becomes lower in the direction indicated by the arrow A). Specifically, the inclined face has one top end corresponding to one end of the rotation shaft 258 as the second shaft and having a first height and another top end corresponding to another end of the rotation shaft 258 and having a second height higher than the first height of the one top end. This structure having the inclined face prevents the tip of the pressure release lever 256 from moving in the direction indicated by the arrow B and applies the pressure release lever 256 a force toward the direction indicated by the arrow A. In other words, the pressing portion 264 having the inclined portion 266 contacts and guides the pressure release lever 256 to restrict the inclination of the rotation shaft 258 as the second shaft relative to the horizontal direction. The inclined portion 266 restricts the inclination of the pressure release lever 256 toward the other end of the rotation shaft 258.

The support 200*a* holds the pressure release lever 256 not to move (incline) the pressure release lever 256 in the direction indicated by the arrow A, which is less likely to incline the pressure release lever 256. The above-described configuration in the image forming apparatus 100 can prevent the pressure release lever 256 from inclining in the rotation axis direction of the rotation shaft 258. In other words, the above-described configuration can prevent the tip of the pressure release lever 256 from moving in the direction of the rotation shaft 258 as the second shaft. As a result, the pressing mechanism 250 can stably press the pressure roller against the fixing belt and stably release the pressure of the pressure roller pressing the fixing belt.

In the above-described configuration of the image forming apparatus 100, no component is added to the fixing unit. In addition, no component is substantially added to the cover 260 that is a molded component. As a result, the layout is hardly changed, and the configuration is relatively simple.

Some modifications of the above-described configuration are described below.

Figure 6:
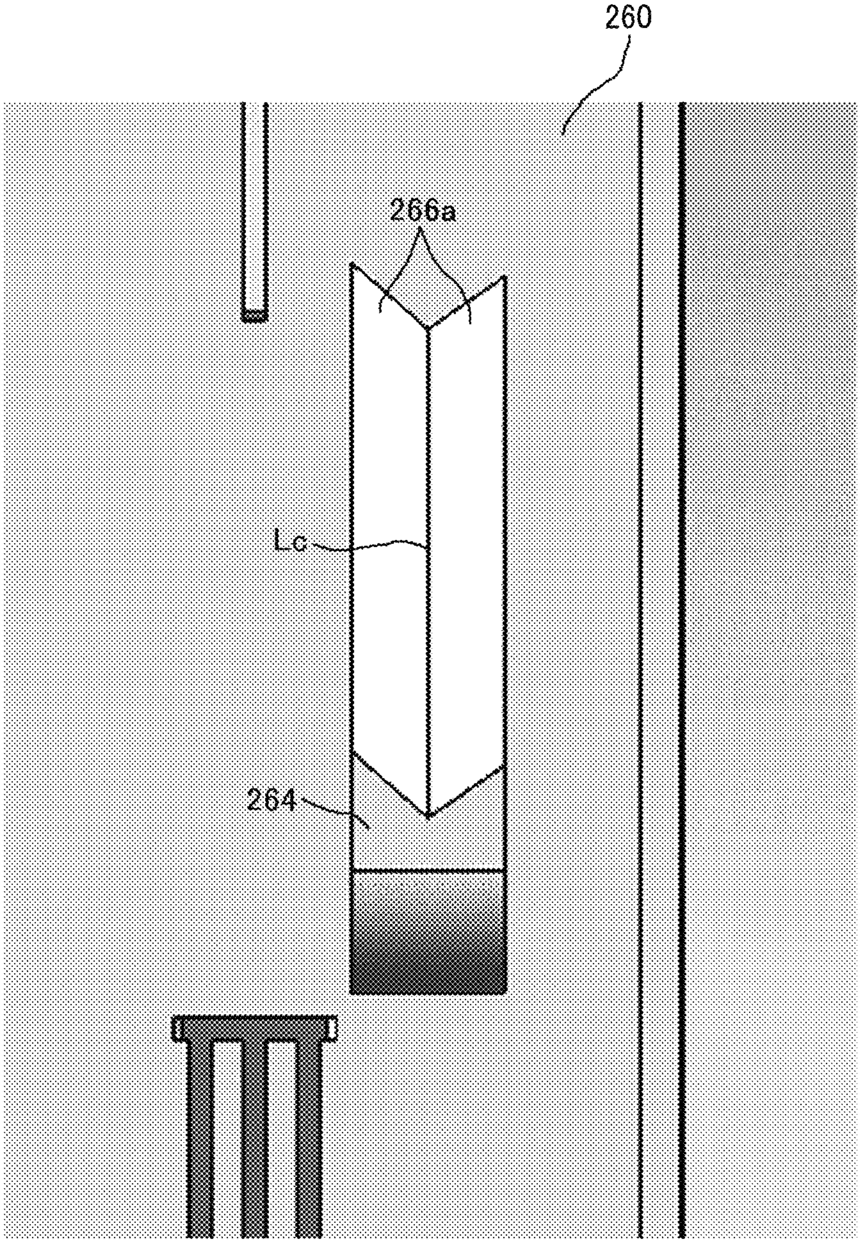
FIG. 6 is a plan view of a pressing portion on a cover according to a first modification.

FIG. 6 is a plan view of a pressing portion of the cover according to a first modification. As illustrated in FIG. 6, an inclined portion 266*a* of the pressing portion 264 has two inclined faces facing each other. In other words, the inclined portion 266*a* of the pressing portion 264 has a V-shaped cross section.

In this case, the inclined portion 266*a* of the pressing portion 264 can guide the movement of the pressure release lever 256 along the center line Lc of the inclined portion 266*a* when the pressing portion 264 presses the pressure release lever 256. Therefore, the amount of movement of the pressure release lever 256 can be reduced as compared with the configuration of FIG. 5.

Figure 7:
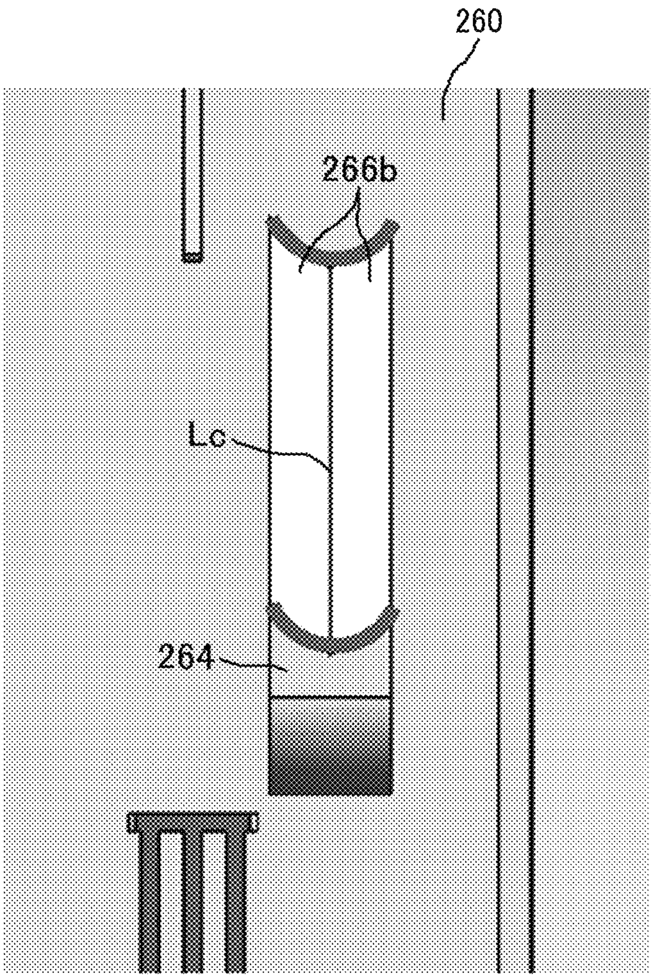
FIG. 7 is a plan view of a pressing portion on a cover according to a second modification.

FIG. 7 is a plan view of a pressing portion of the cover according to a second modification. As illustrated in FIG. 7, an inclined portion 266*b* of the pressing portion 264 has two inclined curved faces facing each other. In other words, the inclined portion 266*a* of the pressing portion 264 has a U-shaped cross section.

In this configuration, reducing the amount of movement of the pressure release lever 256 pressed by the inclined portion 266*b* reduces a force received by the pressure release lever 256. The above-described configuration can reduce the stress in the direction inclining the pressure release lever.

A description is given below of advantageous configurations of the pressure release lever.

FIGS. 8A and 8B illustrate a pressure release lever according to modifications of the above-described pressure release lever. FIGS. 8A and 8B are schematic diagrams each illustrating a part of the shape of the pressure release lever.

As illustrated in FIG. 8A, the pressure release lever 256 preferably has a tapered shape that tapers toward a tip 256*a*, and the tip 256*a* preferably contacts the inclined portion 266. In other words, the pressure release lever 256 has the tip 256*a* opposite to a rear end rotatably supported by the rotation shaft 258 as the second shaft and has a tapered shape that tapers toward the tip 256*a*. In this case, the inclined portion 266 contacts the tip 256*a* of the pressure release lever 256 in response to the closing operation of the cover, and the tip 256*a* of the pressure release lever 256 easily follows the inclined portion 266 of the pressing portion 264, which reliably prevents the pressure release lever 256 from inclining.

As illustrated in FIG. 8B, the tip 256*a* of the pressure release lever 256 is preferably rounded. In this case, the tip 256*a* of the pressure release lever 256 easily follows the inclined portion 266 of the pressing portion 264, which reliably prevents the pressure release lever 256 from inclining.

Supplemental information is described below.

The above-described configurations may be applied to a fixing device including a planar heater as a heat source instead of the fixing device illustrated in FIG. 2. Such a fixing device 300 is described with reference to FIGS. 9 and 10.

With reference to FIG. 9, the fixing device 300 installed in the image forming apparatus 100 includes a fixing belt 321 as the fixing rotator, a pressure roller 331 as the pressure rotator, and a planar heater 324 as a heating unit (the heat source).

The fixing device 300 includes pressing levers 352 of a pressing device 351. The pressing levers press flanges 342 such that the fixing belt 321 presses against the pressure roller 331. A pair of flanges 342 guides ends of the inner circumferential surface of the fixing belt 321 in the width direction of the fixing belt 321 such that the fixing belt 321 maintains a substantially cylindrical posture.

Figure 10A:
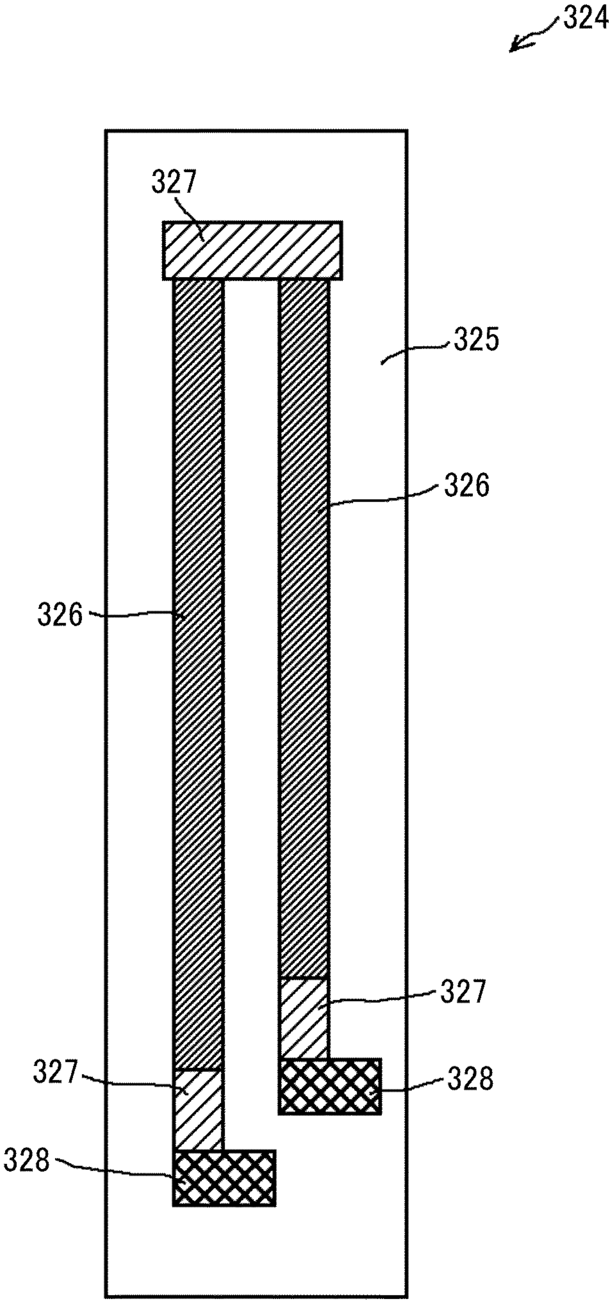
FIG. 10A is a front view of a planar heater.
Figure 10B:
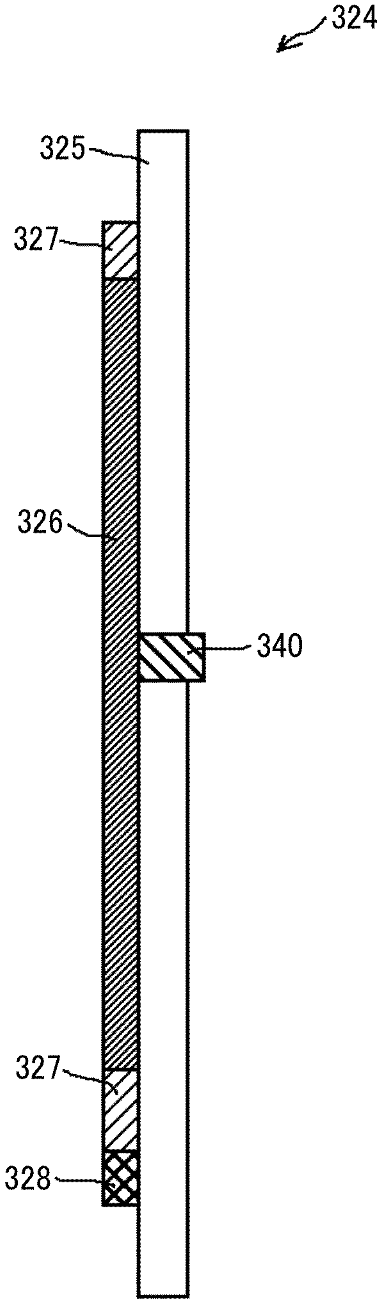
FIG. 10B is a side cross-sectional view of the planar heater of FIG. 10A.

Inside the loop of the fixing belt 321, the planar heater 324, a holder 323 and a stay 330 are disposed The planar heater 324 is disposed so as to extend in a width direction that is the lateral direction in FIG. 9 and the vertical direction in FIG. 10. The planar heater 324 contacts the inner circumferential surface of the fixing belt 321. The planar heater 324 is pressed against the pressure roller 331 via the fixing belt 321 to form the fixing nip through which the sheet P is conveyed.

With reference to FIG. 10, the planar heater 324 includes a base 325, resistor patterns 326 (resistive heat generators), conductor patterns 327 (relay portions), power supply electrodes 328 as electrodes.

The base 325 has a front face facing the inner circumferential surface of the fixing belt 321 in the fixing nip. At least the front face of the base 325 is made of an insulative material. In the present embodiment, the base 325 is entirely made of the insulative material (aluminum nitride (AlN) in the present embodiment).

The resistor patterns 326 are formed on the front face of the base 325. Similarly, the conductor patterns 327 are also formed on the front face of the base 325. A current flows through the resistor pattern 326 (that is, energizing the resistor pattern 326), the resistance of the resistor pattern 326 generates heat, and the resistor pattern 326 functions as the resistive heat generator. The resistor pattern 326 is formed by applying and screen-printing a paste prepared to have a desired resistance value to the surface of the base 325 and baking the paste after screen-printing.

Each of the conductor patterns 327 electrically couples the resistor patterns 326 or couples the resistor pattern 326 to the power supply electrode 328 to function as the relay portion that flows the current input from the power supply electrode 328 to the resistor pattern 326. The conductor pattern 327 is formed by applying and screen-printing a paste having high conductivity to the surface of the base 325 and baking the paste after screen-printing.

The power supply electrode 328 is electrically coupled to the conductor pattern 327 and is formed to couple to a connector that is an external terminal. Accordingly, even when the surface layer having electrical insulating properties and low friction properties is formed on the entire surface of the planar heater 324, a part of the surface layer over the power supply electrode 328 is removed to expose the power supply electrode 328 and supply power to the power supply electrode 328.

The power supply electrode 328 is made of a silver-based material such as silver (Ag) or silver palladium (AgPd) in order to reduce heat generation due to energization. In the present embodiment, the power supply electrode 328 is formed by screen-printing the material on the surface of the base 325 and baking the material after screen-printing.

The planar heater 324 has the one face forming the fixing nip and the other face opposite to the one face. The fixing device 300 includes a thermistor 340 as a heat sensitive element facing the other face of the planar heater 324. The thermistor 340 may be in direct contact with the other face of the planar heater 324 or may be in indirect contact with the other face of the planar heater 324.

In the above-described fixing device 300, a power supply supplies electric power to the resistor pattern 326 serving as the resistive heat generator, and the resistor pattern 326 generates heat according to the resistance of the resistor pattern 326 to heat the fixing belt 321.

The planar heater 324 may include a surface layer or a sheet made of low friction material such as PTFE on the surface of the planar heater 324 to reduce sliding friction between the fixing belt 321 and the planar heater 324.

Some embodiments of the present disclosure have been described in detail above. The above-described embodiments are examples and can be modified within the scope not departing from the gist of the present disclosure. For example, embodiments, modifications, and advantageous configurations may be combined with each other.

Aspects of the present disclosure are, for example, as follows.

First Aspect

In a first aspect, an image forming apparatus has following characteristics. The image forming apparatus includes a pressing mechanism to press a pressing body against a pressed body and a cover that can open and close the body of the image forming apparatus. The body houses the pressing mechanism. The pressing mechanism releases pressure of the pressing body pressing the pressed body in conjunction with an operation to open the cover and presses the pressing body against the pressed body in conjunction with an operation to close the cover. The pressing mechanism includes a pressure lever and a pressure release lever. The pressure lever presses the pressing body against the pressed body and has one end rotatably supported by a shaft and another end at which an elastic body is disposed. The pressure release lever is rotatably supported and coupled to the pressure lever via the elastic body. The pressure release lever can move between a holding position to press the pressing body against the pressed body and a release position to release the pressure of the pressing body pressing the pressed body. The cover includes a pressing portion pressing the pressure release lever during the operation to close the cover and moves the pressure release lever from the release position to the holding position. The pressing portion includes an inclined portion contacting the pressure release lever to restrict inclination of the pressure release lever in a direction of a rotation shaft of the pressure release laver.

Second Aspect

In a second aspect, the inclined portion in the image forming apparatus according to the first aspect has an inclined face inclined in one direction.

Third Aspect

In a third aspect, the inclined portion in the image forming apparatus according to the first aspect has two inclined faces facing each other.

Fourth Aspect

In a fourth aspect, the inclined portion in the image forming apparatus according to the first aspect has two inclined curved faces facing each other.

Fifth Aspect

In a fifth aspect, the inclined portion in the image forming apparatus according to any one of the first to fourth aspects is in contact with a tip of the pressure release lever, and the pressure release lever has a tapered shape that tapers toward the tip.

Sixth Aspect

In a sixth aspect, the pressure release lever in the image forming apparatus according to any one of the first to fifth aspects has a rounded tip.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image forming apparatus comprising:

a pressing mechanism including:

a pressure lever rotatable about a first shaft, the pressure lever to press a pressing body against a pressed body;

a pressure release lever rotatable about a second shaft, the pressure release lever movable between:

a holding position to cause the pressure lever to press the pressing body against the pressed body; and a release position to cause the pressure lever to release the pressing body from the pressed body;

an elastic body coupling the pressure lever and the pressure release lever;

a body housing the pressing mechanism; and a cover openably closing the body housing, the cover including a pressing portion to press and move the pressure release lever from the release position to the holding position in response to a closing operation to close the cover, and the pressing portion having an inclined portion contacting and guiding the pressure release lever to restrict an inclination of the second shaft relative to a horizontal direction, wherein the inclined portion prevents the pressure release lever from tilting in a direction of the second shaft.

2. The image forming apparatus according to claim 1, wherein:

the pressing mechanism includes a support rotatably holding one end of the second shaft, another end of the second shaft is a free end, and the inclined portion restricts an inclination of the pressure release lever toward said another end of the second shaft.

3. The image forming apparatus according to claim 2, wherein;

the inclined portion has an inclined face having:

one top end corresponding to one end of the second shaft, the one top end having a first height; and another top end corresponding to another end of the second shaft, another top end having a second height higher than the first height of the one top end.

4. The image forming apparatus according to claim 1, wherein:

the inclined portion has two inclined faces facing each other.

5. The image forming apparatus according to claim 1, wherein:

the inclined portion has two inclined curved faces facing each other.

6. The image forming apparatus according to claim 1, wherein:

the pressure release lever has a tip opposite to a rear end rotatably supported by the second shaft, the inclined portion contacts the tip of the pressure release lever in response to the closing operation of the cover, and the pressure release lever has a tapered shape that tapers toward the tip.

7. The image forming apparatus according to claim 1, wherein:

the pressure release lever has a rounded tip.

8. The image forming apparatus according to claim 1, wherein:

the inclined portion of the pressing portion has a V-shaped cross section.

9. The image forming apparatus according to claim 1, wherein:

the inclined portion of the pressing portion has a U-shaped cross section.

10. The image forming apparatus according to claim 1, wherein:

the pressed body includes a fixing belt.

11. The image forming apparatus according to claim 10, wherein:

the fixing belt includes an elastic layer having a thickness of 100 μm or more.

12. The image forming apparatus according to claim 10, further comprising:

a nip formation pad disposed inside a loop of the fixing belt.

13. The image forming apparatus according to claim 12, further comprising:

a thermal conductor covering a face of the nip formation pad.

14. The image forming apparatus according to claim 12, further comprising:

a stay holding the nip formation pad.

15. The image forming apparatus according to claim 1, wherein:

the pressing body comprises a pressure roller.

16. The image forming apparatus according to claim 15, wherein:

the pressure roller includes a core and an elastic rubber layer disposed on the core.

17. The image forming apparatus according to claim 1, further comprising:

a planar heater functioning as a heat source.

18. The image forming apparatus according to claim 17, wherein:

the planar heater includes a base and a resistor pattern formed on a front face of the base.

19. The image forming apparatus according to claim 18, further comprising:

a thermistor facing a face of the planar heater opposite to the front face.

20. An image forming apparatus, comprising:

a pressing mechanism including:

a pressure lever rotatable about a first shaft, the pressure lever to press a pressing body against a pressed body;

a pressure release lever rotatable about a second shaft, the pressure release lever movable between:

a holding position to cause the pressure lever to press the pressing body against the pressed body; and a release position to cause the pressure lever to release the pressing body from the pressed body;

an elastic body coupling the pressure lever and the pressure release lever;

a body housing the pressing mechanism; and a cover openably closing the body housing, the cover including a pressing portion to press and move the pressure release lever from the release position to the holding position in response to a closing operation to close the cover, and the pressing portion having an inclined portion contacting and guiding the pressure release lever to restrict an inclination of the second shaft relative to a horizontal direction, wherein:

the pressing mechanism includes a support rotatably holding one end of the second shaft, another end of the second shaft is a free end, the inclined portion restricts an inclination of the pressure release lever toward said another end of the second shaft, and the inclined portion has an inclined face having:

one top end corresponding to one end of the second shaft, the one top end having a first height; and another top end corresponding to another end of the second shaft, another top end having a second height higher than the first height of the one top end.

* * * * *